(12) United States Patent
Boyapalle et al.

(10) Patent No.: US 11,347,846 B2
(45) Date of Patent: May 31, 2022

(54) REAL-TIME MONITORING AND POLICY ENFORCEMENT OF ACTIVE APPLICATIONS AND SERVICES

(71) Applicant: Dell Products, L.P., Round Rock, TX (US)

(72) Inventors: Anantha K. Boyapalle, Cedar Park, TX (US); Abeye Teshome, Austin, TX (US); Vaibhav Soni, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 164 days.

(21) Appl. No.: 16/983,807

(22) Filed: Aug. 3, 2020

(65) Prior Publication Data

US 2022/0035909 A1 Feb. 3, 2022

(51) Int. Cl.
*G06F 21/00* (2013.01)
*G06F 21/55* (2013.01)
*H04L 9/40* (2022.01)
*G06F 21/52* (2013.01)

(52) U.S. Cl.
CPC ............ *G06F 21/554* (2013.01); *G06F 21/52* (2013.01); *H04L 63/18* (2013.01); *G06F 2221/033* (2013.01)

(58) Field of Classification Search
CPC .. G06F 21/554; G06F 21/52; G06F 2221/033; H04L 63/18
See application file for complete search history.

(56) References Cited

U.S. PATENT DOCUMENTS

| | | | | |
|---|---|---|---|---|
| 2011/0296488 A1* | 12/2011 | Dandekar | ............... | G06F 21/57 726/1 |
| 2014/0237220 A1* | 8/2014 | O'Rourke | ............. | G06F 21/575 713/1 |
| 2014/0344886 A1* | 11/2014 | Gillon | ................... | H04L 63/205 726/1 |
| 2019/0294800 A1* | 9/2019 | Andrews | ............... | G06F 21/602 |

* cited by examiner

*Primary Examiner* — Ghazal B Shehni
(74) *Attorney, Agent, or Firm* — Fogarty LLP (57) ABSTRACT

Embodiments of systems and methods for real-time monitoring and policy enforcement of active applications and services are described. In some embodiments, an Information Handling System (IHS) may include a processor and a memory coupled to the processor, the memory having program instructions stored thereon that, upon execution by the processor, cause the IHS to: provide a hardware-rooted, Operating System (OS)-agnostic resource monitoring agent; receive, at the resource monitoring agent from a remote resource monitoring service via an out-of-band channel, a resource enforcement policy; determine, by the resource monitoring agent, that an application is using or attempting to use a resource in a manner that conflicts with the resource enforcement policy; and stop or prevent the application from using the resource in response to the determination.

19 Claims, 3 Drawing Sheets

REAL-TIME MONITORING AND POLICY ENFORCEMENT OF ACTIVE APPLICATIONS AND SERVICES

FIELD

The present disclosure relates generally to Information Handling Systems (IHSs), and more particularly, to systems and methods for real-time monitoring and policy enforcement of active applications and services in an IHS.

BACKGROUND

As the value and use of information continue to increase, individuals and businesses seek additional ways to process and store it. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

An IHS can execute many different types of applications. In that regard, the inventors hereof have recognized that monitoring IHS resources and enforcing policies upon active applications and services is critical for resilient productivity. To address this, and other issues, the inventors hereof have developed a resource management system capable of enforcing policies even when an Operating System (OS) is under attack or compromised.

SUMMARY

Embodiments of systems and methods for real-time monitoring and policy enforcement of active applications and services are described. In an illustrative, non-limiting embodiment, an Information Handling System (IHS) may include a processor and a memory coupled to the processor, the memory having program instructions stored thereon that, upon execution by the processor, cause the IHS to: provide a hardware-rooted, Operating System (OS)-agnostic resource monitoring agent; receive, at the resource monitoring agent from a remote resource monitoring service via an out-of-band channel, a resource enforcement policy; determine, by the resource monitoring agent, that an application is using or attempting to use a resource in a manner that conflicts with the resource enforcement policy; and stop or prevent the application from using the resource in response to the determination.

In some cases, the processor may include an Embedded Controller (EC). The resource monitoring agent may establish a root-of-trust with a hardware trust module during a boot process. The hardware trust module may include a Trusted Platform Module (TPM). The out-of-band channel may include a Management Engine (ME) channel, and the resource enforcement policy may be received using Management Component Transport Protocol (MCTP) communications.

The resource enforcement policy may include a list one or more applications, one or more resources associated with each application, and a restriction associated with each resource. The program instructions, upon execution, may cause the IHS to select one of a plurality of resource enforcement policies or restrictions based upon context information.

The context information may include at least one of: an identity of a user, a time-of-day, a day-of-the-week, a calendar event, a type of calendar event, an application currently under execution, a duration of execution of an application, a mode of execution of an application, a user's proximity to the IHS, or a user's gaze direction. Additionally, or alternatively, the context information may include at least one of: a current location of the IHS, a current memory usage, a characteristic of a current network connection, a current power usage, an identification of a currently connected peripheral device, or a current IHS posture.

In another illustrative, non-limiting embodiment, a memory storage device may have program instructions stored thereon that, upon execution by one or more processors of an IHS, cause the IHS to: provide a hardware-rooted, OS-agnostic resource monitoring agent; receive, at the resource monitoring agent from a remote resource monitoring service via an out-of-band channel, a resource enforcement policy; determine, by the resource monitoring agent, that an application is using or attempting to use a resource in a manner that conflicts with the resource enforcement policy; and stop or prevent the application from using the resource in response to the determination.

In yet another illustrative, non-limiting embodiment, a method may include: providing a hardware-rooted, OS-agnostic resource monitoring agent; receiving, at the resource monitoring agent from a remote resource monitoring service via an out-of-band channel, a resource enforcement policy; determining, by the resource monitoring agent, that an application is using or attempting to use a resource in a manner that conflicts with the resource enforcement policy; and stopping or preventing the application from using the resource in response to the determination.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Systems and methods for real-time monitoring and policy enforcement of active applications and services in an Information Handling System (IHS) are described. In some embodiments, these systems and methods may include a hardware-rooted, protected, and Operating System (OS)-agnostic compute environment that provides an additional layer of protection to a resource management service.

A remote policy enforcer/management engine running on a cloud IHS may communicate with an agent running on the endpoint IHS. Such a system may be configured change profiles, integrity requirements, and/or enforcement attributes to enable different policies using a secure, out-of-band communication channel without depending on the OS. A method may enable continuous or periodic monitoring of services which may sometimes be running and misusing resources without adhering to the policies. By continuously monitoring the running applications for memory usage, I/O, and/or access to sensitive data, however, systems and methods described herein may ensure a successful detection of attack on the IHS so that proper measures for mitigation may be taken.

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 1:
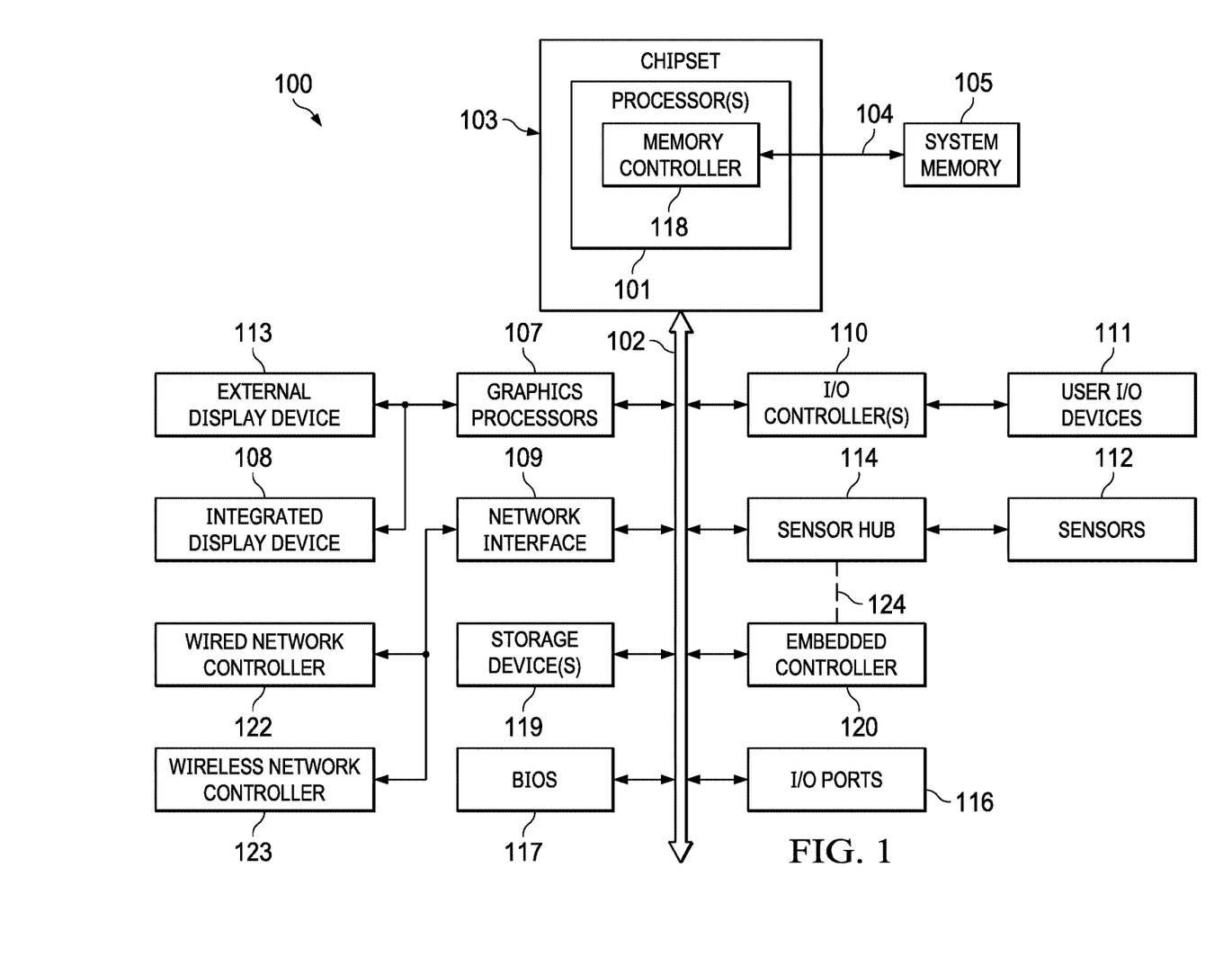
FIG. 1 is a block diagram of an example of an Information Handling System (IHS) configured to perform real-time monitoring and policy enforcement of active applications and services, according to some embodiments.

FIG. 1 is a block diagram illustrating components of IHS 100 configured to perform real-time monitoring and policy enforcement of active applications and services. As shown, IHS 100 includes one or more processors 101, such as a Central Processing Unit (CPU), that execute code retrieved from system memory 105. Although IHS 100 is illustrated with a single processor 101, other embodiments may include two or more processors, that may each be configured identically, or to provide specialized processing operations. Processor 101 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, processor 101 includes an integrated memory controller 118 that may be implemented directly within the circuitry of processor 101, or memory controller 118 may be a separate integrated circuit that is located on the same die as processor 101. Memory controller 118 may be configured to manage the transfer of data to and from the system memory 105 of IHS 100 via high-speed memory interface 104. System memory 105 that is coupled to processor 101 provides processor 101 with a high-speed memory that may be used in the execution of computer program instructions by processor 101.

Accordingly, system memory 105 may include memory components, such as static RAM (SRAM), dynamic RAM (DRAM), NAND Flash memory, suitable for supporting high-speed memory operations by the processor 101. In certain embodiments, system memory 105 may combine both persistent, non-volatile memory and volatile memory. In some implementations, system memory 105 may include multiple removable memory modules.

IHS 100 utilizes chipset 103 that may include one or more integrated circuits that are connect to processor 101. In the embodiment of FIG. 1, processor 101 is depicted as a component of chipset 103. In other embodiments, all of chipset 103, or portions of chipset 103 may be implemented directly within the integrated circuitry of processor 101. Chipset 103 provides processor 101 with access to a variety of resources accessible via bus 102. In IHS 100, bus 102 is illustrated as a single element. Various embodiments may utilize any number of separate buses to provide the illustrated pathways served by bus 102.

In various embodiments, IHS 100 may include one or more I/O ports 116 that may support removeable couplings with various types of external devices and systems, including removeable couplings with peripheral devices that may be configured for operation by a particular user of IHS 100. For instance, I/O 116 ports may include USB (Universal Serial Bus) ports, by which a variety of external devices may be coupled to IHS 100. In addition to or instead of USB ports, I/O ports 116 may include various types of physical I/O ports that are accessible to a user via the enclosure of the IHS 100.

In certain embodiments, chipset 103 may additionally utilize one or more I/O controllers 110 that may each support the operation of hardware components such as user I/O devices 111 that may include peripheral components that are physically coupled to I/O port 116 and/or peripheral components that are wirelessly coupled to IHS 100 via network interface 109. In various implementations, I/O controller 110 may support the operation of one or more user I/O devices 110 such as a keyboard, mouse, touchpad, touchscreen, microphone, speakers, camera and other input and output devices that may be coupled to IHS 100. User I/O devices 111 may interface with an I/O controller 110 through wired or wireless couplings supported by IHS 100. In some cases, I/O controllers 110 may support configurable operation of supported peripheral devices, such as user I/O devices 111.

As illustrated, a variety of additional resources may be coupled to processor(s) 101 of IHS 100 through chipset 103. For instance, chipset 103 may be coupled to network interface 109 that may support different types of network connectivity. IHS 100 may also include one or more Network Interface Controllers (NICs) 122 and 123, each of which may implement the hardware required for communicating via a specific networking technology, such as Wi-Fi, BLUETOOTH, Ethernet and mobile cellular networks (e.g., CDMA, TDMA, LTE). Network interface 109 may support network connections by wired network controllers 122 and wireless network controllers 123. Each network controller 122 and 123 may be coupled via various buses to chipset 103 to support different types of network connectivity, such as the network connectivity utilized by IHS 100.

Chipset 103 may also provide access to one or more display device(s) 108 and/or 113 via graphics processor 107. Graphics processor 107 may be included within a video card, graphics card or within an embedded controller installed within IHS 100. Additionally, or alternatively, graphics processor 107 may be integrated within processor 101, such as a component of a system-on-chip (SoC). Graphics processor 107 may generate display information and provide the generated information to one or more display device(s) 108 and/or 113, coupled to IHS 100.

One or more display devices 108 and/or 113 coupled to IHS 100 may utilize LCD, LED, OLED, or other display technologies. Each display device 108 and 113 may be capable of receiving touch inputs such as via a touch controller that may be an embedded component of the display device 108 and/or 113 or graphics processor 107, or it may be a separate component of IHS 100 accessed via bus 102. In some cases, power to graphics processor 107, integrated display device 108 and/or external display 133 may be turned off or configured to operate at minimal power levels in response to IHS 100 entering a low-power state (e.g., standby).

As illustrated, IHS 100 may support integrated display device 108, such as a display integrated into a laptop, tablet, 2-in-1 convertible device, or mobile device. IHS 100 may also support use of one or more external displays 113, such as external monitors that may be coupled to IHS 100 via various types of couplings, such as by connecting a cable from the external display 113 to external I/O port 116 of the IHS 100. In certain scenarios, the operation of integrated displays 108 and external displays 113 may be configured for a particular user. For instance, a particular user may prefer specific brightness settings that may vary the display brightness based on time of day and ambient lighting conditions.

Chipset 103 also provides processor 101 with access to one or more storage devices 119. In various embodiments, storage device 119 may be integral to IHS 100 or may be external to IHS 100. In certain embodiments, storage device 119 may be accessed via a storage controller that may be an integrated component of the storage device. Storage device 119 may be implemented using any memory technology allowing IHS 100 to store and retrieve data. For instance, storage device 119 may be a magnetic hard disk storage drive or a solid-state storage drive. In certain embodiments, storage device 119 may be a system of storage devices, such as a cloud system or enterprise data management system that is accessible via network interface 109.

As illustrated, IHS 100 also includes Basic Input/Output System (BIOS) 117 that may be stored in a non-volatile memory accessible by chipset 103 via bus 102. Upon powering or restarting IHS 100, processor(s) 101 may utilize BIOS 117 instructions to initialize and test hardware components coupled to the IHS 100. BIOS 117 instructions may also load an operating system (OS) (e.g., WINDOWS, MACOS, iOS, ANDROID, LINUX, etc.) for use by IHS 100.

BIOS 117 provides an abstraction layer that allows the operating system to interface with the hardware components of the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

Certain IHS 100 embodiments may utilize sensor hub 114 capable of sampling and/or collecting data from a variety of hardware sensors 112. For instance, sensors 112, may be disposed within IHS 100, and/or display 110, and/or a hinge coupling a display portion to a keyboard portion of IHS 100, and may include, but are not limited to: electric, magnetic, hall effect, radio, optical, infrared, thermal, force, pressure, touch, acoustic, ultrasonic, proximity, position, location, angle, deformation, bending, direction, movement, velocity, rotation, acceleration, bag state (in or out of a bag), and/or lid sensor(s) (open or closed).

In some cases, one or more sensors 112 may be part of a keyboard or other input device. Processor 101 may be configured to process information received from sensors 112 through sensor hub 114, and to perform methods for performing real-time monitoring and policy enforcement of active applications and services using contextual information obtained from sensors 112.

For instance, during operation of IHS 100, the user may open, close, flip, swivel, or rotate display 108 to produce different IHS postures. In some cases, processor 101 may be configured to determine a current posture of IHS 100 using sensors 112.

For example, in a dual-display IHS implementation, when a first display 108 (in a first IHS portion) is folded against a second display 108 (in a second IHS portion) so that the two displays have their backs against each other, IHS 100 may be said to have assumed a book posture. Other postures may include a table posture, a display posture, a laptop posture, a stand posture, or a tent posture, depending upon whether IHS 100 is stationary, moving, horizontal, resting at a different angle, and/or its orientation (landscape vs. portrait).

In a laptop posture, a first display surface of a first display 108 may be facing the user at an obtuse angle with respect to a second display surface of a second display 108 or a physical keyboard portion. In a tablet posture, a first display 108 may be at a straight angle with respect to a second display 108 or a physical keyboard portion. And, in a book posture, a first display 108 may have its back resting against the back of a second display 108 or a physical keyboard portion.

It should be noted that the aforementioned postures, and their various respective keyboard states, are described for sake of illustration. In different embodiments, other postures may be used, for example, depending upon the type of hinge coupling the displays, the number of displays used, or other accessories.

In other cases, processor 101 may process user presence data received by sensors 112 and may determine, for example, whether an IHS's end-user is present or absent. Moreover, in situations where the end-user is present before IHS 100, processor 101 may further determine a distance of the end-user from IHS 100 continuously or at pre-determined time intervals. The detected or calculated distances may be used by processor 101 to classify the user as being in the IHS's near-field (user's position<threshold distance A), mid-field (threshold distance A<user's position<threshold distance B, where B>A), or far-field (user's position>threshold distance C, where C>B) with respect to IHS 100 and/or display 108.

More generally, in various implementations, processor 101 may receive and/or to produce system context information using sensors 112 including one or more of, for example: a user's presence state (e.g., present, near-field, mid-field, far-field, absent), a facial expression of the user, a direction of the user's gaze, a user's gesture, a user's voice, an IHS location (e.g., based on the location of a wireless access point or Global Positioning System), IHS movement (e.g., from an accelerometer or gyroscopic sensor), lid state (e.g., of a laptop), hinge angle (e.g., in degrees), IHS posture (e.g., laptop, tablet, book, tent, and display), whether the IHS is coupled to a dock or docking station, a distance between the user and at least one of: the IHS, the keyboard, or a display coupled to the IHS, a type of keyboard (e.g., a physical keyboard integrated into IHS 100, a physical keyboard external to IHS 100, or an on-screen keyboard), whether the user operating the keyboard is typing with one or two hands (e.g., holding a stylus, or the like), a time of day, software application(s) under execution in focus for receiving keyboard input, whether IHS 100 is inside or outside of a carrying bag, ambient lighting, a battery charge level, whether IHS 100 is operating from battery power or is plugged into an AC power source (e.g., whether the IHS is operating in AC-only mode, DC-only mode, or AC+DC mode), a power consumption of various components of IHS 100 (e.g., CPU 101, GPU 107, system memory 105, etc.).

In certain embodiments, sensor hub 114 may be an independent microcontroller or other logic unit that is coupled to the motherboard of IHS 100. Sensor hub 114 may be a component of an integrated system-on-chip incorporated into processor 101, and it may communicate with chipset 103 via a bus connection such as an Inter-Integrated Circuit (VC) bus or other suitable type of bus connection. Sensor hub 114 may also utilize an I²C bus for communicating with various sensors supported by IHS 100.

As illustrated, IHS 100 may utilize embedded controller (EC) 120, which may be a motherboard component of IHS 100 and may include one or more logic units. In certain embodiments, EC 120 may operate from a separate power plane from the main processors 101 and thus the OS operations of IHS 100. Firmware instructions utilized by EC 120 may be used to operate a secure execution system that may include operations for providing various core functions of IHS 100, such as power management, management of operating modes in which IHS 100 may be physically configured and support for certain integrated I/O functions. In some embodiments, EC 120 and sensor hub 114 may communicate via an out-of-band signaling pathway or bus 124.

In various embodiments, IHS 100 may not include each of the components shown in FIG. 1. Additionally, or alternatively, IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 101 as an SoC.

Figure 2:
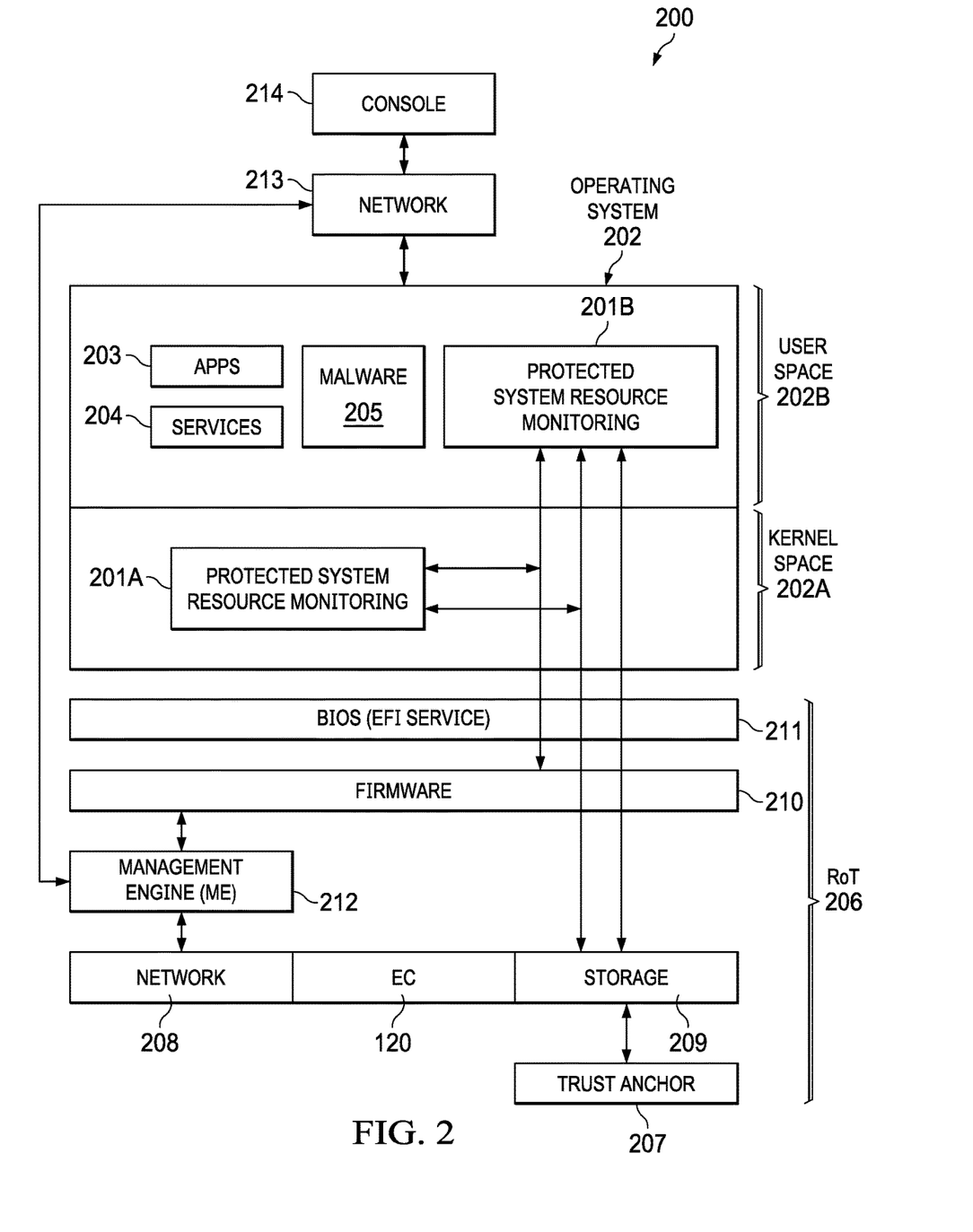
FIG. 2 is a block diagram illustrating an example of a software system configured to perform real-time monitoring and policy enforcement of active applications and services, according to some embodiments.

FIG. 2 is a block diagram illustrating an example of software system 200 produced by IHS 100 for performing real-time monitoring and policy enforcement of active applications and services. In some embodiments, each element of software system 200 may be provided by IHS 100 through the execution of program instructions by one or more logic components (e.g., CPU 100, EC 120, etc.) stored in system memory 105, storage device(s) 119, and/or firmware 117, 120.

As shown, Protected System Resource Monitoring (PSRM) agent 201A is executed in kernel space 202A (for increased protection) and/or PSRM agent 201B is executed in user space 202B of OS 202. In some cases, whether PSRM agent 201 is executed in kernel space 202A or user space 202B as agents 201A or 201B, respectively, may be determined by policy and/or context information.

OS 202 also enables execution of applications 203, services 204, and, in some cases, malware 205. Examples of applications 203 include, but are not limited to, computing resource-intensive applications such as remote conferencing applications, video editors, image editors, sound editors, video games, etc.; as well as less resource-intensive applications, such as media players, web browsers, document processors, email clients, etc. Meanwhile, services 204 may include any process that runs in the background. Also, malware 205 may include viruses, worms, spyware, adware, ransomware, etc.

During boot of IHS 100, Root-of-Trust (RoT) 206 is established between trust anchor 207 (e.g., a Trusted Platform Module or "TPM"), EC 120 (comprising network 209 and storage 210) executing EC firmware 210, and EFI service 211. Particularly, RoT 206 is created when trust anchor 207 establishes a trusted relationship with UEFI service 211 in the BIOS and then with PSRM agent 201. As part of the booting process, EC 120 verifies the integrity of EFI service 211, which in turn verifies the integrity of PSRM agent 201A in kernel space 202A, for example, sometimes before the OS completely boots.

In some cases, EC firmware 210 may be configured to receive data collected by sensors 112, and to pass that sensor data as context information on to PSRM agent 201. OS 202 may communicate with PSRM console 214 (e.g., executed by a remote server IHS) using in-band communications over network 213. In some cases, PSRM agent 201 may communicate with PSRM console 214 via an out-of-band channel under control of Management Engine (ME) 212 via EC firmware 210. In some cases, ME 212 may communicate with PSRM console 214, for example, to receive a resource enforcement or PSRM policy (e.g., an XML file) using Management Component Transport Protocol (MCTP) communications, or the like.

PSRM agent 201 may process user presence data received by one or more sensors 112 and it may determine, for example, whether an IHS's end-user is present or absent. Moreover, in cases where the end-user is present before the IHS, PSRM agent 201 may further determine a distance of the end-user from the IHS continuously or at pre-determined time intervals. The detected or calculated distances may be used by PSRM agent 201 to classify the user as being in the IHS's near-field, mid-field, or far-field.

PSRM agent 201 may also communicate with an energy estimation engine or the like (e.g., the MICROSOFT's E3 engine), which is configured to provide energy usage data broken down by applications, services, tasks, and/or hardware in an IHS. In some cases, PSRM agent 201 may use the energy estimation engine to determine, for example, whether any of applications 203 are being executed in the foreground or in the background (e.g., minimized, hidden, etc.) of the IHS's graphical user interface (GUI).

PSRM agent 201 may also communicate with a data collection engine (e.g., DELL's DATA VAULT) configured to collect information about an IHS's health, performance, and environment. In some cases, PSRM agent 201 may use the data collection engine to receive and maintain a database or table that includes information related to IHS hardware utilization (e.g., by application, by thread, by hardware resource, etc.), power source (e.g., AC-plus-DC, AC-only, or DC-only), etc.

In operation, PSRM agent 201 may further monitor applications 203 executing on IHS 100. Particularly, PSRM agent 201 may gather data associated with the subset of I/O parameters for a predetermined period of time (e.g., 15, 30, 45, 60 minutes or the like). For each of applications 203, PSRM agent 201 may use the gathered data to characterize the application's workload with various settings, memory usage, responsiveness, etc.

As such, software system 200 may keep a track of open handles/files being used by applications 203 and services 204 to determine which processes are accessing certain resources such as: microphone, webcam, location, etc. This resource tracking data and information is stored in an enclave environment to provide hardware backed protection using EC 120 having an authoritative entity (e.g., trust anchor 207) from which the whole chain of trust 120 is derived.

PSRM console 214 may push PSRM policies to PSRM agent 201 completely bypassing OS 202 through the secure, out-of-band channel. The PSRM policy first gets to ME 212 and then is sent over to the agent 201 using EFI service 211.

RoT 206 can be utilized for authentication and report the health of IHS 100 to remote PSRM console 214, and to make sure that a protected resource manager is in place. Applications 203 and services 204 are be monitored by PSRM agent 201 and, based on their resource utilization, PSRM policies can be enforced, and malware 205 may be detected. For example, a third-party text editor accessing a webcam can be detected and mitigation actions can be subsequently taken.

Figure 3:
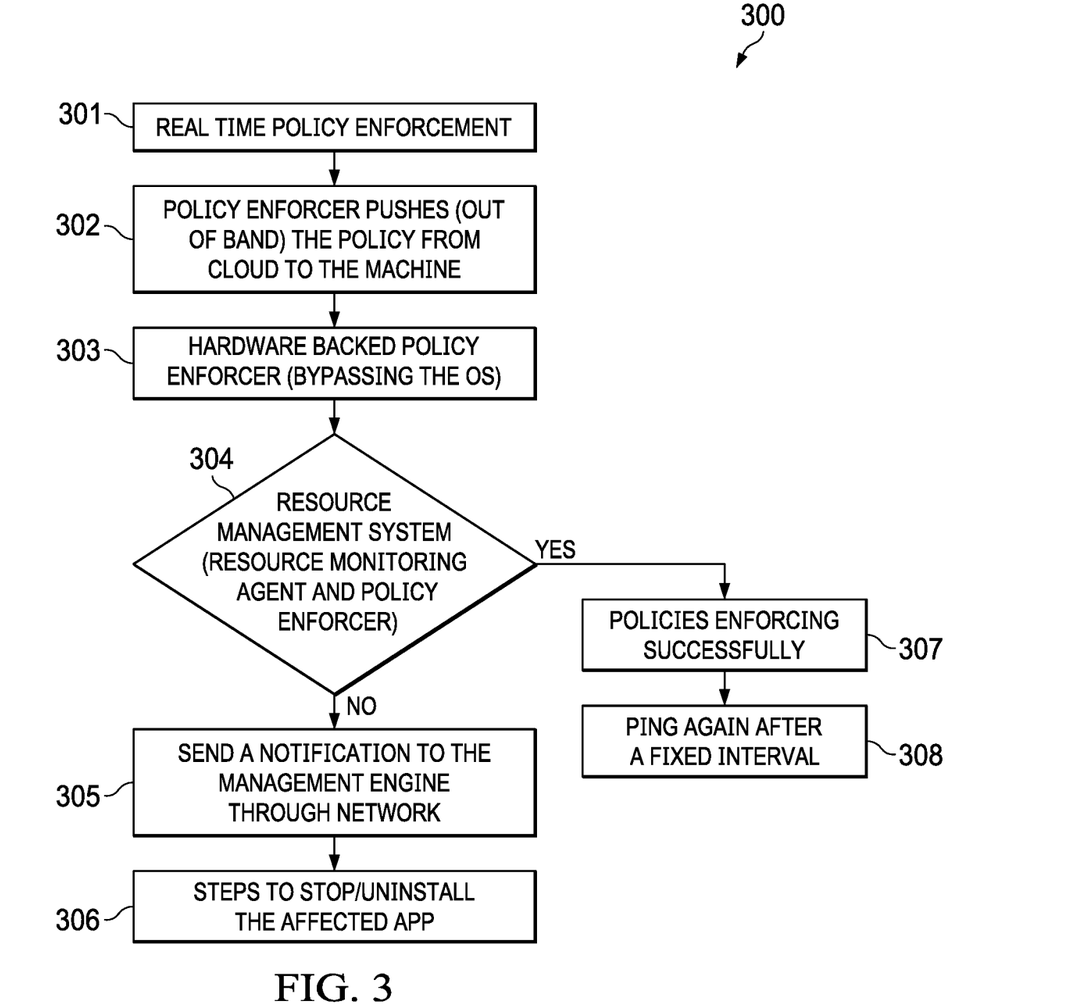
FIG. 3 is a flowchart illustrating an example of a method for real-time monitoring and policy enforcement of active applications and services, according to some embodiments.

FIG. 3 is a flowchart illustrating an example of method 300 for real-time monitoring and policy enforcement of active applications and services. In some embodiments, method 300 may be executed, at least in part, by operation of PSRM agent 201. As noted above, PSRM agent 201 may monitor applications 203 and processes 204 executing on IHS 100, gather data from sensors 112 for a predetermined period of time, and use context information data to select and/or enforce a PSRM policy received from PSRM console 214 over an out-of-band communication channel.

Particularly, real-time policy enforcement begins at block 301. At block 302, method 300 includes policy enforcer or PSRM console 214 pushing a PSRM policy from the cloud to IHS 100. At block 303, method 300 includes performs hardware-backed policy enforcement. For example, in some cases, a PSRM policy may include a list one or more applications, one or more resources (e.g., hardware resources) associated with each application, and a restriction (e.g., allowed or forbidden, throttled, etc.) associated with each resource. In some cases, block 303 may select a PSRM policy and/or enforce a restriction based upon context information.

At block 304, method 300 determines whether the restrictions outlined in the selected PSRM policy are being respected by applications 203. If so, block 307 concludes that the policy is being successfully enforced and block 308 evaluates the policy again after a fixed time interval. Otherwise, block 305 sends a notification to a management engine (e.g., ME 212) and/or block 306 initiates operations to stop and/or uninstalled the offending application.

To illustrate the operation of method 300 with a use-case, consider a situation where PSRM console 216 sends an updated PSRM policy to IHS 100 with a restriction that requires that all applications 203 stop using a given webcam resource. The PSRM policy is sent through a secure channel comprising of ME 212, EC 120 and then sent over EFI service 206 to PSRM agent 201A running in OS kernel 202A.

PSRM agent 201A gets the device ID of the webcam of IHS 100. The device ID may be tracked back to the processes attached to it, and the traced processes may be linked to a running application 203 or service 204. The related telemetry information about handles, files, keys, and/or hardware used by the application are recorded and stored in a secure enclave (e.g., EC storage 210) to add hardware-backed security. In this example, a "WINDOWS camera" application 203 may be accessing a webcam service 204 and it may be stopped as required to enforce the new PSRM policy (or to detect if the PSRM policy is being violated).

In some cases, the PSRM policy may be selected among a plurality of other policies by PSRM agent 201 and/or console 214 based upon any suitable combination of the aforementioned context information (e.g., an identity of a user, a time-of-day, a day-of-the-week, a calendar event, a type of calendar event, an application currently under execution, a duration of execution of an application, a mode of execution of an application, a user's proximity to the IHS, a user's gaze direction, a current location of the IHS, a current memory usage, a characteristic of a current network connection, a current power usage, an identification of a currently connected peripheral device, a current IHS posture, etc.).

Additionally, or alternatively, a decision by PSRM agent 201 and/or console 214 of whether or not to enforce a particular restriction against a given application may be based upon any suitable combination of the aforementioned context information. Additionally, or alternatively, a decision by PSRM agent 201 of whether to use an out-of-band or an in-band communication channel may be performed based upon any suitable combination of the aforementioned context information. Additionally, or alternatively, a decision of whether to launch PSRM agent in kernel space 202A or user space 202B may be performed based upon any suitable combination of the aforementioned context information.

In various embodiments, systems and methods described herein may provide hardware-rooted trusted compute environment that ensures a protected environment for the resource monitoring system that completely bypasses the OS for policy delivery to IHS 100. If such an event occurs, IHS 100 can notify an administrator, for instance, that the policies are no longer being enforced. A protected resource manager may monitor and detect malware/services, which might be attacking IHS 100 and accessing certain services and data unknowingly. As such, these systems and methods may be used to protect a system resource management service which monitors the running services and applications for policy enforcement and prevents misuse of the resources.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor; and
a memory coupled to the processor, the memory having program instructions stored thereon that, upon execution by the processor, cause the IHS to:
provide a hardware-rooted, Operating System (OS)-agnostic resource monitoring agent;
receive a resource enforcement policy at the resource monitoring agent from a remote resource monitoring service using Management Component Transport Protocol (MCTP) communications via a Management Engine (ME) channel;
determine, by the resource monitoring agent, that an application is using or attempting to use a resource in a manner that conflicts with the resource enforcement policy; and
stop or prevent the application from using the resource in response to the determination.

2. The IHS of claim 1, wherein the processor comprises an Embedded Controller (EC).

3. The IHS of claim 1, wherein the resource monitoring agent establishes a root-of-trust with a hardware trust module during a boot process.

4. The IHS of claim 3, wherein the hardware trust module comprises a Trusted Platform Module (TPM).

5. The IHS of claim 1, wherein the resource enforcement policy comprises a list one or more applications, one or more resources associated with each application, and a restriction associated with each resource.

6. The IHS of claim 5, wherein the program instructions, upon execution, further cause the IHS to select one of a plurality of resource enforcement policies or restrictions based upon context information.

7. The IHS of claim 6, wherein the context information comprises at least one of: an identity of a user, a time-of-day, a day-of-the-week, a calendar event, a type of calendar event, an application currently under execution, a duration of execution of an application, a mode of execution of an application, a user's proximity to the IHS, or a user's gaze direction.

8. The IHS of claim 6, wherein the context information comprises at least one of: a current location of the IHS, a current memory usage, a characteristic of a current network connection, a current power usage, an identification of a currently connected peripheral device, or a current IHS posture.

9. A memory storage device having program instructions stored thereon that, upon execution by one or more processors of an Information Handling System (IHS), cause the IHS to:
provide a hardware-rooted, Operating System (OS)-agnostic resource monitoring agent;
receive a resource enforcement policy at the resource monitoring agent from a remote resource monitoring service using Management Component Transport Protocol (MCTP) communications via a Management Engine (ME) channel;
determine, by the resource monitoring agent, that an application is using or attempting to use a resource in a manner that conflicts with the resource enforcement policy; and
stop or prevent the application from using the resource in response to the determination.

10. The memory storage device of claim 9, wherein the resource enforcement policy comprises a list one or more applications, one or more resources associated with each application, and a restriction associated with each resource.

11. The memory storage device of claim 10, wherein the application comprises a video conferencing application, wherein the resource comprises a camera coupled to the IHS, and wherein the restriction comprises a time-of-day or a day-of-the-week that the video conferencing application is allowed to or forbidden from accessing the camera.

12. The memory storage device of claim 10, wherein the program instructions, upon execution, further cause the IHS to select one of a plurality of resource enforcement policies or restrictions based upon at least one of: a user's proximity to the IHS or a current IHS posture.

13. The memory storage device of claim 10, wherein the program instructions, upon execution, further cause the IHS to select one of a plurality of resource enforcement policies or restrictions based upon a current location of the IHS.

14. The memory storage device of claim 10, wherein the program instructions, upon execution, further cause the IHS to select one of a plurality of policies or restrictions based upon: an identity of a user, a time-of-day, a day-of-the-week, a calendar event, a type of calendar event, a user's gaze direction, a current memory usage, a characteristic of a current network connection, a current power usage, an identification of a currently connected peripheral device.

15. A method, comprising:
providing a hardware-rooted, Operating System (OS)-agnostic resource monitoring agent;
receiving a resource enforcement policy at the resource monitoring agent from a remote resource monitoring service using Management Component Transport Protocol (MCTP) communications via a Management Engine (ME) channel;

determining, by the resource monitoring agent, that an application is using or attempting to use a resource in a manner that conflicts with the resource enforcement policy; and stopping or preventing the application from using the resource in response to the determination.

16. The method of claim 15, wherein the resource enforcement policy comprises a list one or more applications, one or more resources associated with each application, and a restriction associated with each resource.

17. The method of claim 16, further comprising selecting one of a plurality of resource enforcement policies or restrictions based upon a user's proximity to the IHS.

18. The method of claim 16, further comprising selecting one of a plurality of resource enforcement policies based upon a current IHS posture.

19. The method of claim 16, further comprising selecting one of a plurality of resource enforcement policies based upon a current location of the IHS.

\* \* \* \* \*